United States Patent
Sin et al.

(10) Patent No.: US 12,396,571 B1
(45) Date of Patent: Aug. 26, 2025

(54) SUPPORTIVE APPARATUS FOR A FURNITURE ITEM

(71) Applicant: Secretlab SG Pte. Ltd., Singapore (SG)

(72) Inventors: Vincent Sin, Singapore (SG); Jon Hao Chan, Singapore (SG); Cheng Feng Elroy Lee, Singapore (SG)

(73) Assignee: Secretlab SG Pte. Ltd., Singapore (SG)

( * ) Notice: Subject to any disclaimer, the term of this patent is extended or adjusted under 35 U.S.C. 154(b) by 0 days.

(21) Appl. No.: 18/948,584

(22) Filed: Nov. 15, 2024

(30) Foreign Application Priority Data

Oct. 8, 2024 (SG) .............. 10202403150Y

(51) Int. Cl.
| | | |
|---|---|---|
| *A47C 27/15* | (2006.01) | |
| *A47C 7/18* | (2006.01) | |
| *A47C 27/14* | (2006.01) | |
| *B32B 3/26* | (2006.01) | |
| *B32B 3/30* | (2006.01) | |
| *B32B 5/18* | (2006.01) | |
| *B32B 5/32* | (2006.01) | |
| *B32B 7/02* | (2019.01) | |
| *B32B 37/12* | (2006.01) | |

(Continued)

(52) U.S. Cl.
CPC .............. *A47C 27/15* (2013.01); *A47C 7/18* (2013.01); *A47C 27/148* (2013.01); *B32B 3/263* (2013.01); *B32B 3/30* (2013.01); *B32B 5/18* (2013.01); *B32B 5/32* (2013.01); *B32B 7/02* (2013.01); *B32B 37/12* (2013.01); *B32B 37/182* (2013.01); *B60N 2/7017* (2013.01); *B32B 2305/022* (2013.01); *B32B 2307/72* (2013.01); *B32B 2307/7376* (2023.05); *B32B 2479/00* (2013.01)

(58) Field of Classification Search
CPC ....... A47C 27/14; A47C 27/148; A47C 27/15; A47C 7/18; B32B 3/00; B32B 3/263; B32B 5/00; B32B 3/30; B32B 5/18; B32B 5/20; B32B 5/32; B32B 7/00; B32B 7/02; B32B 37/12; B32B 37/182; B32B 2307/7376; B32B 2305/022; B32B 2307/72; B32B 2479/00; B60N 2/7017
See application file for complete search history.

(56) References Cited

U.S. PATENT DOCUMENTS 5,165,752 A * 11/1992 Terry ..................... B62J 1/18
297/202
5,851,457 A * 12/1998 Peterson ............. B29C 44/146
264/102

(Continued)

*Primary Examiner* — Chi Q Nguyen
(74) *Attorney, Agent, or Firm* — Viering, Jentschura & Partner mbB

(57) ABSTRACT

Disclosed is a supportive apparatus for a furniture item, the supportive apparatus comprising a first layer comprising a first polymeric foam material having a first density ranging from 30 kg/m³ to 60 kg/m³; a second layer disposed on the first layer, the second layer comprising a second polymeric foam material having a second density ranging from 60 kg/m³ to 90 kg/m³, wherein the second layer comprises a unitary layer of the second polymeric foam material. Further disclosed is a method for manufacturing the supportive apparatus, and a method of fitting the supportive apparatus on a furniture item.

22 Claims, 8 Drawing Sheets

(51) Int. Cl.
  *B32B 37/18*    (2006.01)
  *B60N 2/70*     (2006.01)

(56) References Cited

U.S. PATENT DOCUMENTS

| | | | |
|---|---|---|---|
| 6,336,681 B1* | 1/2002 | Crosbie | A47C 7/18 |
| | | | 297/452.21 |
| 2009/0142555 A1* | 6/2009 | Sano | C09D 11/322 |
| | | | 427/256 |
| 2017/0086593 A1* | 3/2017 | Silver | A47C 27/15 |
| 2018/0079338 A1* | 3/2018 | Takemoto | B60N 2/64 |
| 2018/0079853 A1* | 3/2018 | Takemoto | B32B 27/40 |
| 2019/0150629 A1* | 5/2019 | Pearce | A47C 27/16 |
| 2019/0150631 A1* | 5/2019 | Pearce | B68G 7/00 |
| 2020/0262696 A1* | 8/2020 | Nelson | B68G 5/00 |
| 2020/0345152 A1* | 11/2020 | Humble | A61G 7/057 |
| 2022/0071398 A1* | 3/2022 | Brandtner | A47C 7/30 |
| 2024/0109467 A1* | 4/2024 | Al Nabulsi | B60N 2/7017 |

* cited by examiner

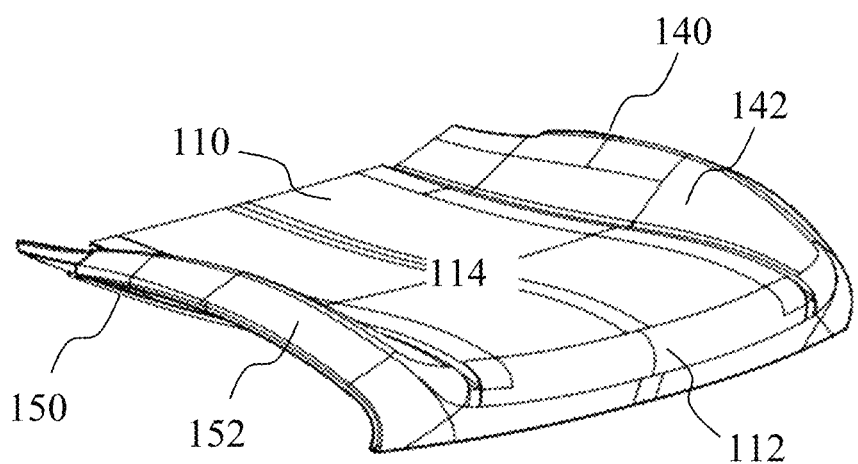
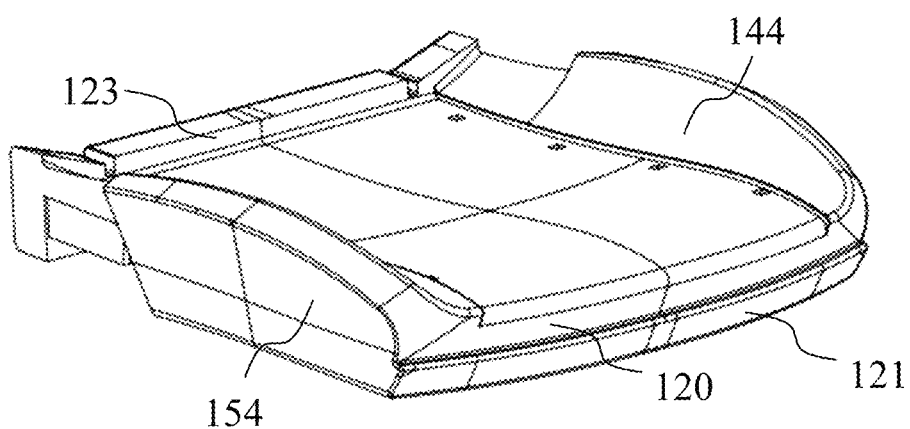
FIG. 1

400 positioning, the second layer of the supportive apparatus on the chassis of the furniture item, the second layer comprising at least one opening extending into an interior of the second layer, the at least one opening configured to receive a fixing means — 402 fixing, the second layer of the supportive apparatus to the chassis of the furniture item, by securing the fixing means to the at least one opening of the second layer — 404

FIG. 7

SUPPORTIVE APPARATUS FOR A FURNITURE ITEM

CROSS-REFERENCE TO RELATED APPLICATIONS

This application claims priority to Singapore Patent Application 10202403150Y, filed on Oct. 8, 2024, the entire contents of which are incorporated by reference.

TECHNICAL FIELD

Various aspects of this disclosure relate to a supportive apparatus for a furniture item, a method of manufacturing the supportive apparatus, and a method of fitting the supportive apparatus onto the furniture item.

BACKGROUND

The following discussion of the background is intended to facilitate an understanding of the present disclosure only. It should be appreciated that the discussion is not an acknowledgment or admission that any of the material referred to was published, known, or is part of the common general knowledge of the person skilled in the art in any jurisdiction as of the priority date of the disclosure.

Conventional supportive apparatuses for mattresses or chairs utilize multiple pieces of foam material, each having similar thickness and shape, to provide a constant firmness for the support and comfort of a user The multiple pieces of foam material may lack the structural integrity, the adjustable firmness and support, and therefore are not able to provide the required ergonomic support needed for long hours. As such, a user spending long hours on such conventional supportive apparatuses may experience discomfort, stiffness and chronic body aches. The multiple pieces of foam material may, over prolonged usage, slide/move relative to one another and compromise the supportive function of the multiple pieces of foam material to the user.

Further, conventional supportive apparatuses are often prone to deformation with long-term use, due to the load placed on the material over time and/or the repeated reclining movement of the apparatus. In addition, the manufacture of the conventional supportive apparatuses comprising multiple pieces of foam material, may be complex and expensive.

Therefore, there is a need for an improved supportive apparatus, and/or method of manufacturing the supportive apparatus, that seeks to address at least one of the aforementioned issues.

SUMMARY

This disclosure was conceptualized to provide an improved supportive apparatus for a furniture item. To this end, the improved supportive apparatus comprises a first polymeric foam material having a density ranging from 30 $kg/m^3$ to 60 $kg/m^3$, and a second polymeric foam material layered thereon, the second polymeric foam material having a density ranging from 60 $kg/m^3$ to 90 $kg/m^3$. The varying densities between the two polymeric foam materials provides structural integrity, even pressure distribution, and ergonomic support for one or more users, which may alleviate the users' body aches and thus improve the health of the user. Further, the improved supportive apparatus is durable and is resistant to deformation with prolonged use. For example, the improved supportive apparatus retains its original shape and structure, despite repeated reclining movement of the apparatus over time, and is suitable for providing optimal ergonomic support for a diverse range of users having varying body weight and shapes. In addition, embodiments of the disclosure provide a simple, inexpensive and quick to assemble manufacturing process of the improved supportive apparatus.

The improved supportive apparatus is particularly applicable for use as a seat base and/or back rest in a chair, e.g. gaming chair or automobile chair, or in a mattress.

According to a first aspect of the disclosure, there is provided a supportive apparatus for a furniture item, the supportive apparatus comprising a first layer comprising a first polymeric foam material having a first density ranging from 30 $kg/m^3$ to 60 $kg/m^3$; a second layer disposed on the first layer, the second layer comprising a second polymeric foam material having a second density ranging from 60 $kg/m^3$ to 90 $kg/m^3$, wherein the second layer comprises a unitary layer of the second polymeric foam material.

In various embodiments, the first polymeric foam material comprises a first matrix structure, the first matrix structure comprising a plurality of first foam cells, and the second polymeric foam material comprises a second matrix structure, the second matrix structure comprising a plurality of second foam cells, the second foam cells being different to the first foam cell, wherein each second foam cell among the plurality of second foam cells, has a density greater than a density of each first foam cell among the plurality of first foam cells.

In various embodiments, the second matrix structure comprising the plurality of second foam cells, has a uniform matrix structure along at least one of a lateral plane, a longitudinal plane, and/or a diagonal plane, of the second layer.

In various embodiments, wherein a ratio of the first density to the second density, ranges from 50% to 95%, optionally, ranging from 60% to 90%.

In various embodiments, the first polymeric foam material has a first indentation force deflection (IFD) score, with 40% deflection, ranging from 20 to 80; and wherein the second polymeric foam material has a second IFD score, with 40% deflection, ranging from 250 to 500.

In various embodiments, the first layer comprises a peripheral portion positioned at an end of the first layer, the peripheral portion having a peripheral thickness; and a medial portion extending from the peripheral portion, in a direction perpendicular to a lateral axis of the first layer, the medial portion having a medial thickness greater than the peripheral thickness of the peripheral portion. In some embodiments, the peripheral thickness ranges from 0.5 cm to 10 cm, and wherein the medial thickness ranges from 15 cm to 25 cm.

In various embodiments, the second layer comprises a recess extending at least partially along a surface of the second layer, and the first layer comprises a protrusion at least partially extending from a surface of the first layer, and wherein the recess of the second layer is configured to receive the protrusion of the first layer. In some embodiments, the recess comprises a first recess segment having a first recess depth, and a second recess segment having a second recess depth greater than the first recess depth, and the protrusion comprises a first protrusion segment having a first protrusion height, and a second protrusion segment having a second protrusion height greater than the first protrusion height, wherein the first recess segment and the second recess segment, are configured to receive the first protrusion segment and the second protrusion segment, respectively.

In various embodiments, an adhesive layer is disposed between the first layer and the second layer, the adhesive layer configured to secure the first layer to the second layer, wherein the adhesive layer has a thickness ranging from 0.1 cm to 0.5 cm. In some embodiments, the adhesive layer comprises an adhesive means disposed at least, partially along the surface of the second layer, and/or partially along the surface of the first layer.

In various embodiments, the first polymeric foam material comprises a memory foam polymer, and the second polymeric foam material comprises a cold-cure foam polymer.

According to a second aspect of the disclosure, there is provided a chair comprising the supportive apparatus of the first aspect. In various embodiments, the supportive apparatus may comprise the seat base, and/or the back rest of the chair. In some embodiments, the supportive apparatus may comprise a part, e.g. the centerpiece of the back rest of the chair.

According to a third aspect of the disclosure, there is provided a mattress comprising the supportive apparatus of the first aspect.

According to a fourth aspect of the disclosure, there is provided a method of manufacturing a supportive apparatus for a furniture item, the method comprising, providing, a first layer comprising a first polymeric foam material having a first density ranging from 30 kg/m$^3$ to 60 kg/m$^3$; providing, a second layer for disposal on the first layer, the second layer comprising a second polymeric foam material having a second density ranging from 60 kg/m$^3$ to 90 kg/m$^3$, wherein the second layer comprises a unitary layer of the second polymeric foam material.

In various embodiments, the first polymeric foam material has a first matrix structure comprising a plurality of first foam cells, and the second polymeric foam material has a second matrix structure comprising a plurality of second foam cells, the second foam cells being different to the first foam cells, wherein each second foam cell among the plurality of second foam cells, has a density greater than a density of each first foam cell among the plurality of first foam cells.

In various embodiments, providing, the first layer comprises, providing, a protrusion at least partially extending from a surface of the first layer; wherein providing, the second layer comprises, providing, a recess extending at least partially along a surface of the second layer, and wherein the recess of the second layer is configured to receive the protrusion of the first layer.

In various embodiments, providing, the first layer further comprises, forming, on another surface of the first layer, a peripheral portion positioned at an end of the first layer, the peripheral portion having a peripheral thickness; and a medial portion extending from the peripheral portion, in a direction perpendicular to a lateral axis of the first layer, the medial portion having a medial thickness greater than the peripheral thickness of the peripheral portion.

In various embodiments, the method further comprises, providing, an adhesive layer for disposal on at least one of the surface of the first layer, and/or a surface of the second layer, for securing the first layer to the second layer; wherein the adhesive layer has a thickness ranging from 0.1 cm to 0.5 cm.

In various embodiments, the second layer is manufactured in accordance with a cold-cure foam manufacturing process.

According to a fifth aspect of the disclosure, there is provided a method of fitting the supportive apparatus of the first aspect onto the furniture item, the furniture item comprising a chassis configured to receive the supportive apparatus, the method comprising, positioning, the second layer of the supportive apparatus on the chassis of the furniture item, the second layer comprising at least one opening extending into an interior of the second layer, the at least one opening configured to receive an attachment means; attaching, the second layer of the supportive apparatus to the chassis of the furniture item, by securing the attachment means to the at least one opening of the second layer.

BRIEF DESCRIPTION OF THE DRAWINGS

The disclosure will be better understood with reference to the detailed description when considered in conjunction with the non-limiting examples and the accompanying drawings, in which:

FIG. 1 shows a schematic illustration of a perspective view of an exemplary supportive apparatus 100 for a furniture item;

FIG. 7 shows a flowchart illustrating a method 400 of fitting a supportive apparatus onto a furniture item;

DETAILED DESCRIPTION

Figure 2:
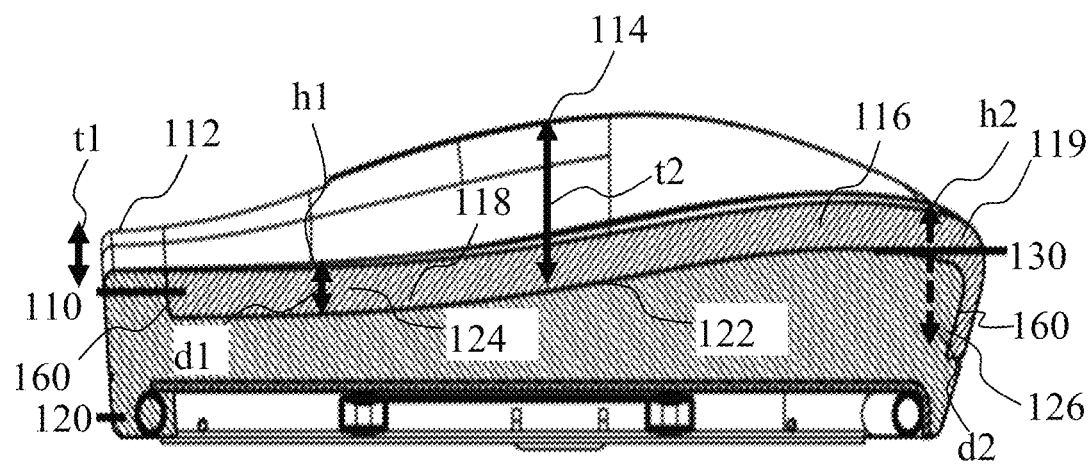
FIG. 2 shows a schematic illustration of a side view of the exemplary supportive apparatus 100 shown in FIG. 1.

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

While such terms as "first," "second," etc., may be used to describe various elements, such elements must not be limited to the above terms. The above terms are used only to distinguish one element from another, and do not define corresponding elements, for example, an order and/or significance of the elements. Without departing a scope of rights of the specification, a first element may be referred to as a second element, and similarly, the second element may be referred to as the first element.

In the context of various embodiments, the articles "a", "an" and "the" as used with regard to a feature or element includes a reference to one or more of the features or elements. As used herein, the term "and/or" includes any and all combinations of one or more of the associated listed items.

In the context of various embodiments, the indicated values, or limit values of the indicated ranges provided below, with regard to the terms "density", "score", "thickness", "height", "depth", may refer to an average of said terms. For example, the indicated values, or limit values of the ranges, for the terms "first density", "second density", "third density", "first indentation force deflection (IFD) score", "second IFD score", "first protrusion height", "second protrusion height", "first recess depth", "second recess depth", "peripheral thickness", "medial thickness", "first thickness", "second thickness", may refer to the average value, or average limit value of the range.

Throughout the description, the term "furniture item", as used herein, may refer to articles suitable for supporting a user and/or providing comfort for the user. The furniture item may refer to household furniture items such as but not limited to a chair, a bed, a sofa, a recliner, an ottoman. In various embodiments, the chair may include a gaming chair, an office chair, a dining chair. The furniture item may also refer to automobile furniture items such as an automobile seat, for example, a driver or passenger seat, or a child car seat.

Throughout the description, the term "supportive apparatus", as used herein, may refer to an object designed for bearing at least, a weight of a user, and to provide comfort for the user, by allowing the user to rest, e.g. sit, recline, kneel, lie, on the supportive apparatus. Non-limiting examples of a supportive apparatus may include a cushion, a pad, a pillow, a mattress. In various embodiments, the supportive apparatus may be a part of the furniture item. For example, the supportive apparatus may be a seat base, and/or a back rest of part thereof, of a chair. In some embodiments, the supportive apparatus may be a mattress. In some embodiments, the supportive apparatus may be removably attached to the furniture item.

Throughout the description, the term "polymeric foam", as used herein, may refer to a solid cellular matrix structure comprising foam cells, which may each have an open-cell or closed-cell structure. The foam cells may be made of a polymer, for example, polyurethane. The structural arrangement of the foam cells within the cellular structure may confer mechanical properties such as density, firmness, and viscoelasticity to the polymeric foam material.

Figure 3:
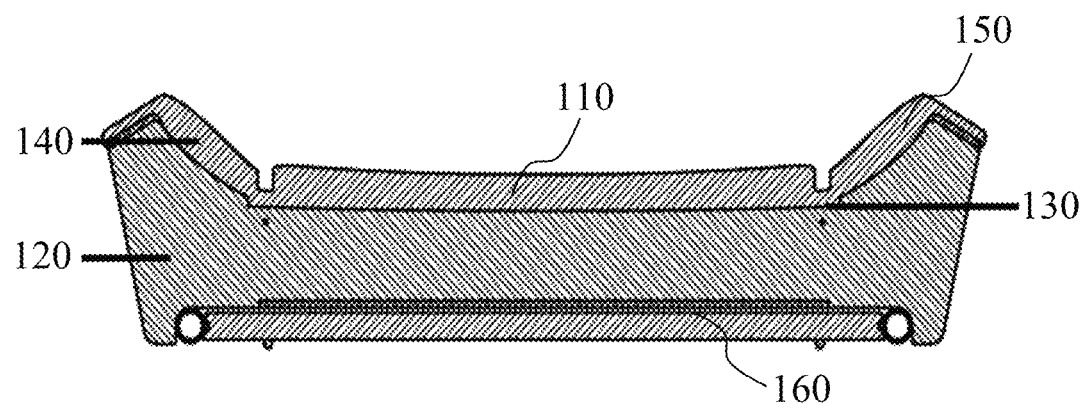
FIG. 3 shows a schematic illustration of a front view of the exemplary supportive apparatus 100 shown in FIGS. 1 and 2.
Figure 4:
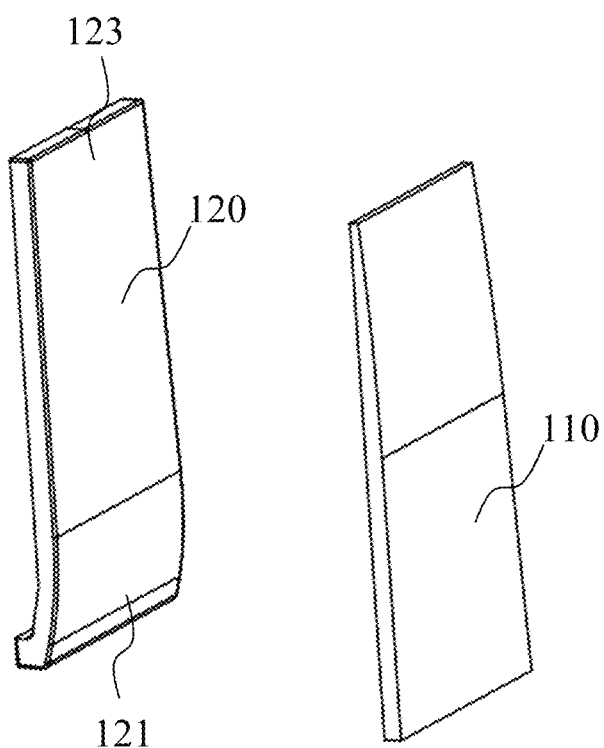
FIG. 4 shows a schematic illustration of a perspective view of another exemplary supportive apparatus 100 for a furniture item.

FIG. 1 shows a schematic illustration of a perspective view of an exemplary supportive apparatus 100 for a furniture item. FIGS. 2 and 3 show a schematic illustration of a side view and a front view, respectively, of the exemplary supportive apparatus 100 shown in FIG. 1. FIG. 4 shows a schematic illustration of a perspective view of another exemplary supportive apparatus 100 for a furniture item.

Referring to FIGS. 1 to 3, the supportive apparatus 100 may comprise a seat base, of a chair. Additionally, or alternatively, the supportive apparatus 100 may be comprised as a back rest of a chair or part thereof, such as a centerpiece of the chair, as shown in FIG. 2. In various embodiments, the chair may be a gaming chair, an office chair, or an automobile seat.

Referring to FIGS. 1 to 4, the supportive apparatus 100 may include a first layer 110 comprising a first polymeric foam material having a first density ranging from 30 $kg/m^3$ to 60 $kg/m^3$. In various embodiments, when the supportive apparatus 100 comprises a seat base as shown in FIGS. 1 to 3, the first density may optionally range from 50 $kg/m^3$ to 60 $kg/m^3$, and optionally at 57.5 $kg/m^3$. In various other embodiments, when the supportive apparatus 100 comprises the centerpiece of back rest as shown in FIG. 4, the first density may optionally range from 35 $kg/m^3$ to 45 $kg/m^3$, optionally at 40 $kg/m^3$.

The first layer 110 comprising the first polymeric foam material may have a first indentation force deflection (IFD) score, at 40% deflection, ranging from 20 to 80. In some embodiments, when the supportive apparatus 100 is comprised as a seat base (see FIGS. 1 to 3), the first IFD score, at 40% deflection, may range from 30 to 40, optionally at 35.5. In some other embodiments, when the supportive apparatus 100 is comprised as a centerpiece of the back rest (see FIG. 4), the first IFD, at 40% deflection, score may range from 45 to 55, optionally at 50.

In various embodiments, the first layer 110 comprising the first polymeric foam material comprises a first matrix structure, the first matrix structure comprising a plurality of first foam cells. The first foam cells may have an open-cell structure. The first matrix structure may comprise loosely-packed first foam cells, each having an internal pocket, i.e. open-cell, with spaces filled with air. As such, the first matrix structure may allow air to flow through and provides a breathable material. The first matrix structure also allows the first layer 110 to be viscoelastic, in that the first layer 110 may be resistant to deformation and may retain its original structure and shape once an applied load, e.g. user's weight, is removed. In some embodiments, the first layer 110 may comprise a memory foam polymer.

Referring to FIGS. 1 to 4, the supportive apparatus 100 further includes a second layer 120 disposed on the first layer 110, the second layer 120 comprising a second polymeric foam material having a second density ranging from 60 $kg/m^3$ to 90 $kg/m^3$, optionally ranging from 60 $kg/m^3$ to 70 $kg/m^3$, and optionally at 66 $kg/m^3$. The second density may be the same, regardless of whether the second layer 120 is comprises as the seat base (see FIGS. 1 to 3), or as the centerpiece of the back rest (see FIG. 4).

In various embodiments, the second layer 120 comprising the second polymeric foam material may have a second IFD score, at 40% deflection, ranging from 250 to 500, optionally ranging from 250 to 350, and optionally at 280. The second IFD score may be the same, regardless of whether the second layer 120 is comprises as the seat base (see FIGS. 1 to 3), or as the centerpiece of the back rest (see FIG. 4).

The second layer 120 comprising the second polymeric foam material comprises a second matrix structure comprising a plurality of second foam cells. The second foam cells may differ from the first foam cells, and may have a closed-cell structure. The second matrix structure may comprise tightly-packed second foam cells, each having a closed and compact structure. Accordingly, each of the second foam cells of the second layer 120 may have a density greater than a density of each of the first foam cells of the first layer 110, and the second matrix structure may provide a second polymeric foam material that is more compact and dense relative to the first polymeric foam material, and having high elastic resilience and durability. In other words, the second layer 120 may not deform upon the application and removal of an applied load, e.g. user's weight, and may retain its original shape and structure over long-term use. In some embodiments, the second layer 120 may comprise a cold-cure foam polymer.

In various embodiments, the second layer 120 comprises a unitary layer of the second polymeric foam material, e.g. cold-cure foam polymer, and has a uniform matrix structure along at least one of a lateral plane, a longitudinal plane, and/or a diagonal plane of the second layer 120. In other words, the second layer 120 may only include an individual, e.g. single, and discrete layer of the second polymeric foam material, and unlike conventional supportive apparatuses, may not comprise multiple layers of foam pieces stacked together, which lacks structural integrity and ergonomic support, and deforms with long-term use. In this regard, the use of a unitary, e.g. single layer of the second polymeric foam material provides uniform consistency throughout the second layer 120, for even pressure distribution, thereby providing the structural integrity and ergonomic support for one or more users, in particular, since the second layer 120 does not comprise multiple pieces of foam material which may slide or move relative to one another and compromise the supportive function of said conventional supportive apparatus.

In various embodiments, a ratio of the first density of the first polymeric foam material of the first layer 110, to the second density of the second polymeric foam material of the second layer 120, may range from 50% to 95%, depending on the part of the furniture item the supportive apparatus 100 is suitable for. In some embodiments, when the supportive apparatus 100 is comprised as a seat base (see FIGS. 1 to 3), the ratio of the first density to the second density may optionally range from 85% to 90%. In some other embodiments, when the supportive apparatus 100 is comprised as a centerpiece of the back rest (see FIG. 4), the ratio of the first density to the second density may optionally range from 55% to 60%.

In various embodiments, the first layer 110, e.g. memory foam polymer, may have varying density and IFD score ranges, depending on the use of the supportive apparatus 100 on the chair, while the second layer 120, e.g. cold-cure foam polymer, may have a constant density and IFD score range, regardless of the use of the supportive apparatus 100 on the chair. For example, the first layer 110 may have a higher density and lower IFD score when comprised as a seat base (see FIGS. 1 to 3), and a lower density but higher IFD score when comprised as a centerpiece of a back rest (see FIG. 4). The second layer 120 may however, have a constant density and IFD score range when comprised as a seat base or a centerpieces of the back rest. The second layer 110 may therefore provide a firm foundation which does not deform under an applied load, while the first layer 110 may provide a viscoelastic layer for the comfort of the user. Accordingly, the supportive apparatus 100 when comprised as a seat base (see FIGS. 1 to 3), provides optimal ergonomic support needed for comfort over long hours; and when comprised as a centerpiece of the back rest (see FIG. 4), is resilient to deformation despite the repeated reclining movement of the back rest.

Referring to FIG. 2, the first layer 110, e.g. memory foam polymer, may further comprise a protrusion 116 extending at least partially from a surface of the first layer 110. The protrusion 116 may extend from the surface that is configured to be disposed on the second layer 120. The protrusion 116 may comprise a first protrusion segment 118 arranged on one end of the protrusion 116, and a second protrusion segment 119 arranged on another end, e.g. opposing end, of the protrusion 116, and in various embodiments, the first protrusion segment 118 may extend and lead to the second protrusion segment 119. It is contemplated that the protrusion 116 may extend fully along a surface of the first layer 110.

In various embodiments, the first protrusion segment 118 may comprise a first protrusion height h1, and a second protrusion segment 119 may comprise a second protrusion height h2 greater than the first protrusion height h1. In some embodiments, the first protrusion height h1 may range from 5 mm to 3 cm, optionally 1 cm to 3 cm, and the second protrusion height h2 may range from 4 cm to 6 cm.

The second layer 120, e.g. cold-cure foam polymer, may comprise a recess 122 extending at least partially along a surface of the second layer 120. The recess 122 may be arranged on the surface configured to be layered on the first layer 110, and may be configured to receive the protrusion 116 of the first layer 110. The recess 122 may comprise a first recess segment 124 arranged on an end of the recess 122, and a second recess segment 126 arranged on another end, e.g. opposing end, of the recess 122. For example, the first recess segment 124 may extend and lead into the second recess segment 126 as shown in FIG. 2. It is contemplated that the recess 122 may extend fully along a surface of the second layer 120.

In various embodiments, the first recess segment 126 may have a first recess depth d1 and the second recess segment 126 may have a second recess depth d2 greater than the first recess depth d1. In some embodiments, the first recess depth d1 may range from 5 mm to 3 cm, and the second recess depth d2 may range from 4 cm to 6 cm, to correspond to the first protrusion height h1 and the second protrusion height h2, respectively, of the protrusion 116. As such, the first recess segment 124 and the second recess segment 126 may be configured to receive the first protrusion segment 118 and second protrusion segment 119, respectively.

The protrusion 116 of the first layer 110 and corresponding recess 122 of the second layer 120 being configured to receive the protrusion 116, may simplify the supportive apparatus 100 manufacturing assembly and process by ensuring that the first layer 110 having a lower IFD score, i.e. being softer, easily fits and assembles on the second layer 120 having a higher IFD score, i.e. being harder. In addition, when the supportive apparatus 100 is comprised as the centerpiece of a back rest (see FIG. 4), the engagement between the protrusion 116 and recess 122 may allow the supportive apparatus 100 to retain its original shape and structure, despite repeated reclining movement of the back rest. While FIGS. 1 to 4 show the engagement between the recess 122 and protrusion 116 of the supportive apparatus 100, it is contemplated that the supportive apparatus 100 may include alternative mating features to case the layering of the first layer 110 on the second layer 120, thereby simplifying the assembly and manufacturing process.

In various embodiments, the supportive apparatus 100 further comprises an adhesive layer 130 disposed between the first layer 110 and the second layer 120, and configured to secure the first layer 110 to the second layer 120. In various embodiments, the adhesive layer 130 may comprise an adhesive means disposed at least, partially or fully along a surface of the second layer 120, and/or partially or fully along a surface of the first layer 110. In some embodiments, the adhesive means may be disposed partially or fully, on both surfaces of the first layer 110 and the second layer 120. For example, the adhesive means may be disposed on the protrusion 116, e.g. first 118 and/or second 119 protrusion segments of the first layer 110, and/or the recess 122, e.g. first 124 and second 126 recess segments of the second layer 120. Non-limiting examples of the adhesive means include a glue and/or one or more hook-and-loop fasteners. It is contemplated that the adhesive means may include any means suitable for securing the first layer 110 and the second layer 120 together.

In various embodiments, the adhesive layer 130 may have a thickness ranging from 0.1 cm to 0.5 cm, optionally from 0.1 cm to 0.3 cm. In some embodiments, the thickness may of the adhesive layer 130 may be uniform so as to not cause discomfort to the user's experience of the supportive apparatus 100.

As shown in FIGS. 1 to 3, in which the supportive apparatus 100 may be comprised as a seat base, the supportive apparatus 100 may further include flared edges 140, 150 arranged on opposing sides of the supportive apparatus 100. In various embodiments, the first layer 110 may comprise first flared edges 142, 152, disposed on second flared edges 144, 154 of the second layer 120.

In various embodiments, the first layer 110 may further comprise, a peripheral portion 112 positioned at an end of the first layer 110 and a medial portion 114 extending from the peripheral portion 112, in a direction perpendicular to the lateral axis of the first layer 110. For example, the medial portion 114 may extends upwards and away from the peripheral portion 112. In various embodiments, the peripheral portion 112 may comprise a peripheral thickness t1 and the medial portion 114 may comprise a medial thickness t2 having a thickness greater than the peripheral thickness t1 (see FIG. 2). In some embodiments, the peripheral thickness t1 ranges from 0.5 cm to 10 cm, optionally from 5 cm to 10 cm; and the medial thickness t2 ranges from 15 cm to 25 cm, optionally from 18 cm to 22 cm. The varying thickness and gradient between the peripheral portion 112 and medial portion 114 of the supportive apparatus 100 provides a "pebble shaped" seat base which provides optimal ergonomic support to accommodate the natural movement of the spine, by providing a larger contact area and a more uniform pressure distribution. In addition, the flared edges 140, 150, may provide more room to accommodate multiple postures of the user. It is further contemplated that the thickness of the first layer 110 and/or second layer 120, and various parts thereof, may be varied to improve the ergonomic properties of the supportive apparatus 100, when comprised as a seat base.

In various embodiments, the second layer 120 may comprise a first portion 121 positioned at one end and having a first thickness, and a second portion 123 positioned at an opposing end of the second layer 120 and having a second thickness (see FIG. 1). In some embodiments, the first portion 121 may have a first thickness ranging from 1 cm to 2.5 cm; and the second portion 123 may have a second thickness ranging from 0.5 cm to 5 cm.

In various other embodiments and with reference to FIG. 4, in which the supportive apparatus 100 may be comprised as a centerpiece of a back rest, the second layer 120 comprises the first portion 121 positioned at one end and having a first thickness, and a second portion 123 positioned at an opposing end of the second layer 120 and having a second thickness. In some other embodiments, the first portion 121 may have a first thickness ranging from 0.5 cm to 2 cm; and the second portion 123 may have a second thickness ranging from 1 cm to 2.5 cm.

Figure 5:
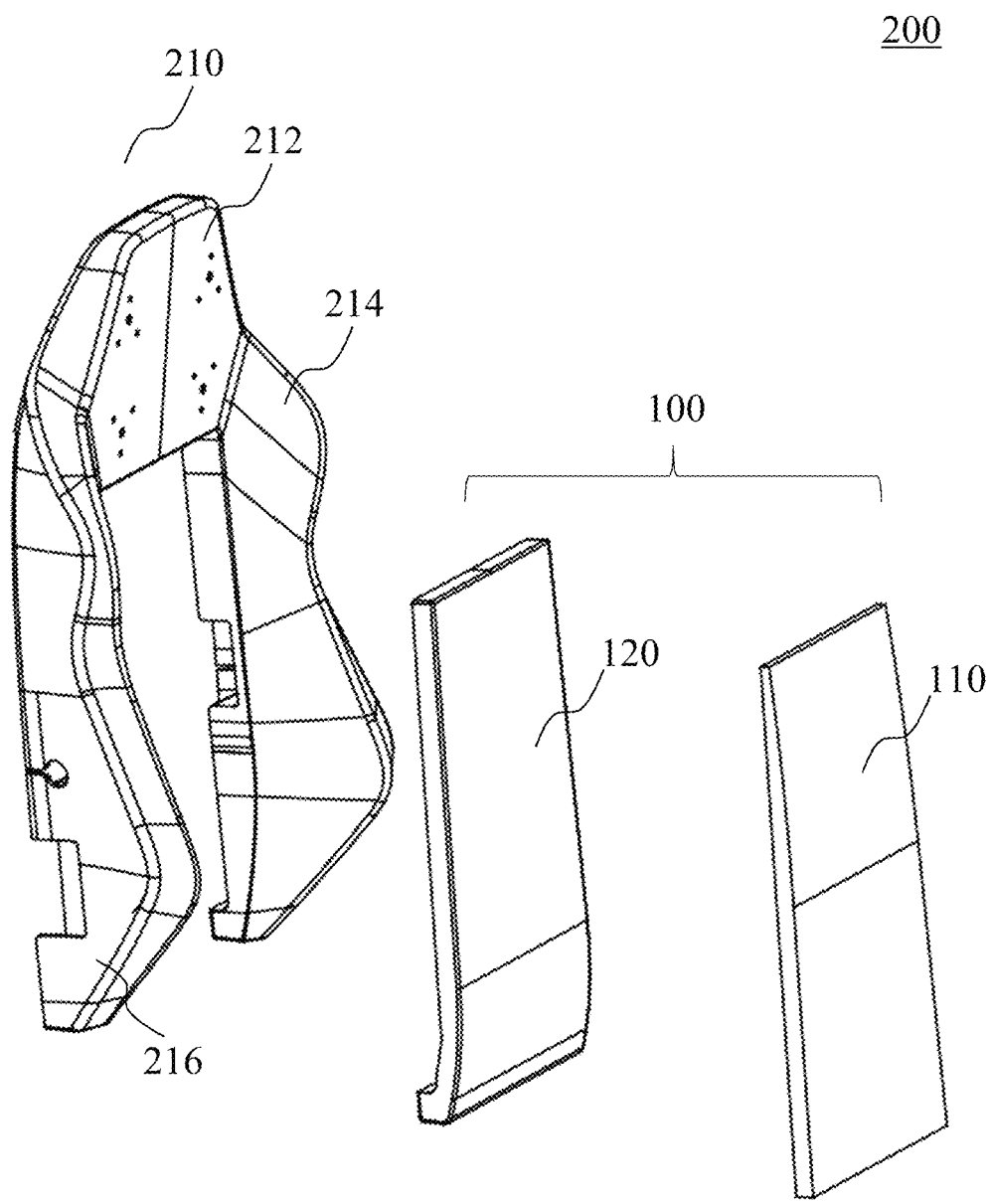
FIG. 5 shows a schematic illustration of an exemplary embodiment of a back rest 200 of a chair, including a supportive apparatus.

FIG. 5 shows a schematic illustration of an exemplary embodiment of a back rest 200 of a chair, including a supportive apparatus. The supportive apparatus may refer to the supportive apparatus 100 as discussed with reference to FIGS. 1 to 4, and repeated descriptions will be omitted.

The back rest 200 may further include an outline layer 210 arranged adjacent to the sides of the supportive apparatus 100. The outline layer 210 may comprise a head rest 212 arranged adjacent to one side of the supportive apparatus 100, and sloping side wings 214, 216 positioned on opposing sides of the supportive apparatus 100.

In various embodiments, the outline layer 210 may comprise a third polymeric foam material having a third density ranging from ranging from 60 kg/m$^3$ to 90 kg/m$^3$, optionally ranging from 60 kg/m$^3$ to 70 kg/m$^3$, and optionally at 66 kg/m$^3$. The third polymeric foam material may however, comprise an IFD score, at 40% deflection, ranging from 250 to 500, optionally ranging from 400 to 500, and optionally at 423. In an embodiment, the third polymeric foam material may comprise a cold-cure foam polymer. In other words, the outline layer 210 may be similar to the second layer 120, in that the third polymeric foam material comprises a third density which may be the same as the second density of the second layer 120, but may have a higher IFD score, i.e. being harder, when compared to the second layer 120. As such, the outline layer 120 may provide additional support to the supportive apparatus 100 during repeated reclining movement of the back rest 200, and the supportive apparatus 100 may retain its original shape and structure.

While the supportive apparatus 100 has been described with reference to the first layer 110 and the second layer 120, it is further contemplated that the supportive apparatus 100 may further include one or more additional layers, disposed on the first layer 110 and/or the second layer 120, and/or between the first layer 100 and the second layer 120. In addition, it is contemplated that the first polymeric foam material, the second polymeric foam material and/or the third polymeric foam material may include perforations to optimize pressure distribution.

According to another aspect of the disclosure, there is provided a chair comprising the supportive apparatus 100 as discussed with reference to FIGS. 1 to 5. In various embodiments, the supportive apparatus 100 may be comprised as a seat base (see FIGS. 1 to 3), and/or a part, e.g. centerpiece of a back rest (see FIGS. 4 and 5).

According to another aspect of the disclosure, there is also provided a mattress comprising the supportive apparatus 100 as discussed with reference to FIGS. 1 to 5. In various embodiments, the supportive apparatus 100 may be positioned at the base of the mattress, and the mattress may further include one or more additional layers disposed on the first layer 110. It is contemplated that the one or more additional layers may comprise a viscoelastic material, for example, a memory foam polymer.

Figure 6:
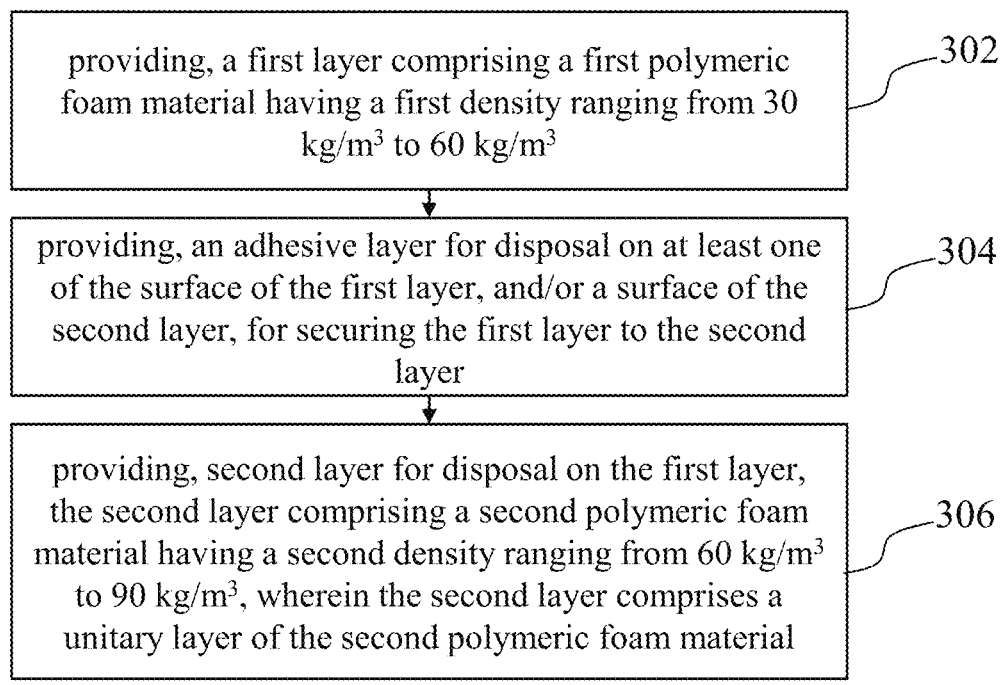
FIG. 6 shows a flowchart illustrating a method 300 for manufacturing a supportive apparatus for a furniture item.

FIG. 6 shows a flowchart illustrating a method 300 for manufacturing a supportive apparatus for a furniture item, in accordance with another aspect of the disclosure. The supportive apparatus may refer to the supportive apparatus 100 discussed with reference to FIGS. 1 to 5, repeated discussions of which will be omitted.

Method 300 includes: providing, a first layer comprising a first polymeric foam material having a first density ranging from 30 kg/m$^3$ to 60 kg/m$^3$ (step 302); providing, a second layer for disposal on the first layer, the second layer comprising a second polymeric foam material having a second density ranging from 60 kg/m³ to 90 kg/m³, wherein the second layer comprises a unitary layer of the second polymeric foam material (step 306). Method 300 may further comprise, providing, an adhesive layer for disposal on at least one of the surface of the first layer, and/or a surface of the second layer, for securing the first layer to the second layer (step 304).

In various embodiments, at step 302, when the seat base comprises the first layer, the first density may optionally range from 50 kg/m³ to 60 kg/m³, and optionally at 57.5 kg/m³. In various other embodiments, when first layer is comprised in the centerpiece of back rest, the first density may optionally range from 35 kg/m³ to 45 kg/m³, and optionally at 40 kg/m³.

In various embodiments, at step 302, the first polymeric foam material may have a first IFD score, at 40% deflection, ranging from 20 to 80. When the first layer is comprised as a seat base, the first IFD score, at 40% deflection, may range from 30 to 40, optionally at 35.5. When the first layer is comprised as a centerpiece of a back rest, the first IFD, at 40% deflection, score may range from 45 to 55, optionally at 50.

In various embodiments, the first polymeric foam material may be a memory foam polymer. The first layer comprising the first polymeric foam material may be manufactured according to a memory foam manufacturing process, which may include a step of molding the first polymeric foam material at a temperature ranging from 20° C. to 35° C., optionally, from 25° C. to 30° C.

In various embodiments, at step 302, providing, the first layer may further comprise, providing, a protrusion at least partially extending from a surface of the first layer. In some embodiments, the protrusion may include a first protrusion segment having a first protrusion height and a second protrusion segment having a second protrusion height greater than the first protrusion height.

In various embodiments, at step 302, providing, the first layer may further comprise, forming, on another surface of the first layer, a peripheral portion positioned at an end of the first layer, the peripheral portion having a peripheral thickness; and a medial portion extending from the peripheral portion, in a direction perpendicular to a lateral axis of the first layer, the medial portion having a medial thickness greater than the peripheral thickness of the peripheral portion.

In various embodiments of method 300, the first polymeric foam material has a first matrix structure comprising a plurality of first foam cells, and the second polymeric foam material has a second matrix structure comprising a plurality of second foam cells, the second foam cells being different from the first foam cells. Each second foam cell among the plurality of second foam cells, may have a density greater than a density of each first foam cell among the plurality of first foam cells.

In various embodiments, at step 306, providing, the second layer comprising a unitary layer of the second polymeric foam material may comprise, providing an individual, e.g. single and discrete layer of the second polymeric foam material, the second polymeric foam material having the second matrix structure comprising the plurality of second foam cells. In some embodiments, the second foam cells may include a closed-cell structure. In other words, the second layer may not include multiple foam pieces stacked together, and may only include one layer of the second polymeric foam material. Accordingly, the second matrix structure may also have a uniform matrix structure along at least one of a lateral plane, a longitudinal plane, and/or a diagonal plane, of the second layer. In this manner, the second layer comprising a unitary layer is able to provide the required structural integrity and ergonomic support for one or more users, since the second layer does not comprise multiple foam pieces stacked together which may slide and move relative to one another to compromise the supportive function of said second layer.

In various embodiments, at step 306, providing, the second layer may further comprise, providing, a second polymeric foam material having a second density ranging from 60 kg/m³ to 90 kg/m³, optionally ranging from 60 kg/m³ to 70 kg/m³, and optionally at 66 kg/m³. The second density may be the same, regardless of whether the second layer comprised in the seat base, or the centerpiece of the back rest.

In various embodiments, at step 306, providing, the second layer may further comprise, providing the second polymeric foam material having a second IFD score, at 40% deflection, ranging from 250 to 500, optionally ranging from 250 to 350, and optionally at 280. The second IFD score may be the same, regardless of whether the second layer is comprised in the seat base, or the centerpiece of the back rest.

In various embodiments, the second polymeric foam material may be a cold-cure foam polymer. The second layer comprising the second polymeric foam material may be manufactured according to a cold-cure manufacturing process, which may include a step of molding the second polymeric foam material at a temperature ranging from 20° C. to 35° C., optionally, from 25° C. to 30° C.

In various embodiments, at step 306, providing the second layer may further comprise, providing, a recess extending at least partially along a surface of the second layer. The recess of the second layer may be configured to receive the protrusion of the first layer.

In various embodiments, at step 304, providing, the adhesive layer may comprise, providing the adhesive layer on the surface of the protrusion of the first layer and/or the surface of the recess of the second layer. In some embodiments, the adhesive layer may have a thickness ranging from 0.1 cm to 0.5 cm, optionally, from 0.1 cm to 0.3 cm.

Figure 8:
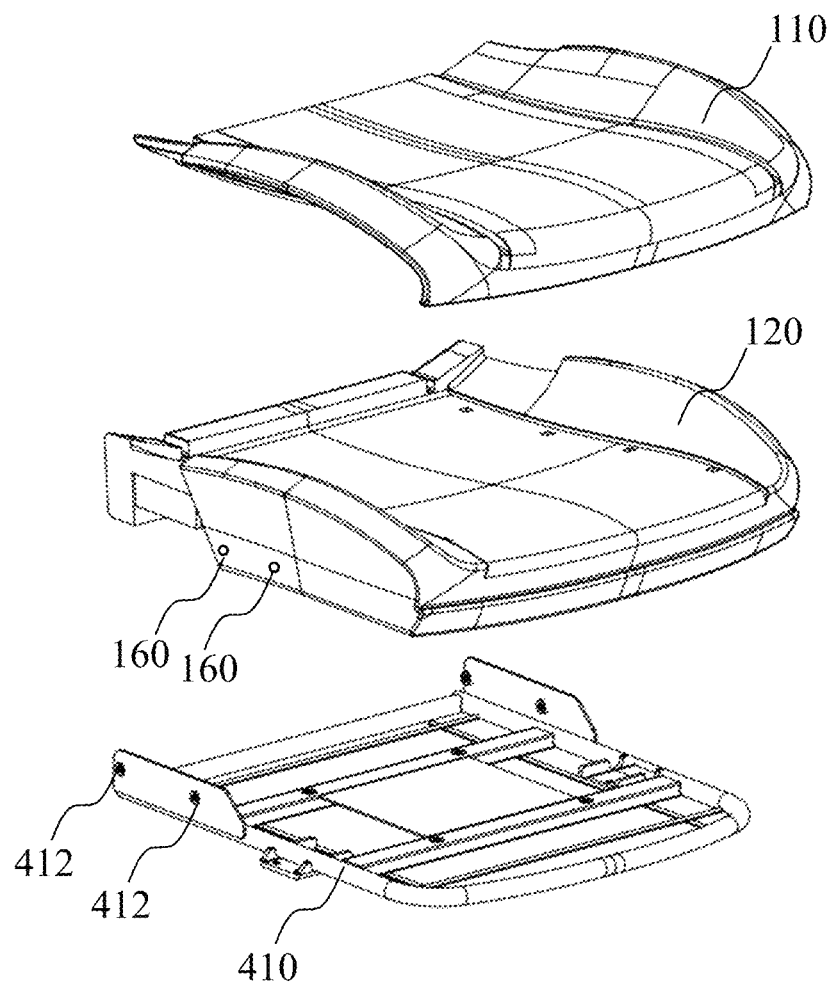
FIG. 8. shows a schematic illustration of the method 400 of fitting the supportive apparatus onto an exemplary furniture item comprising a seat base of a chair.
Figure 9:
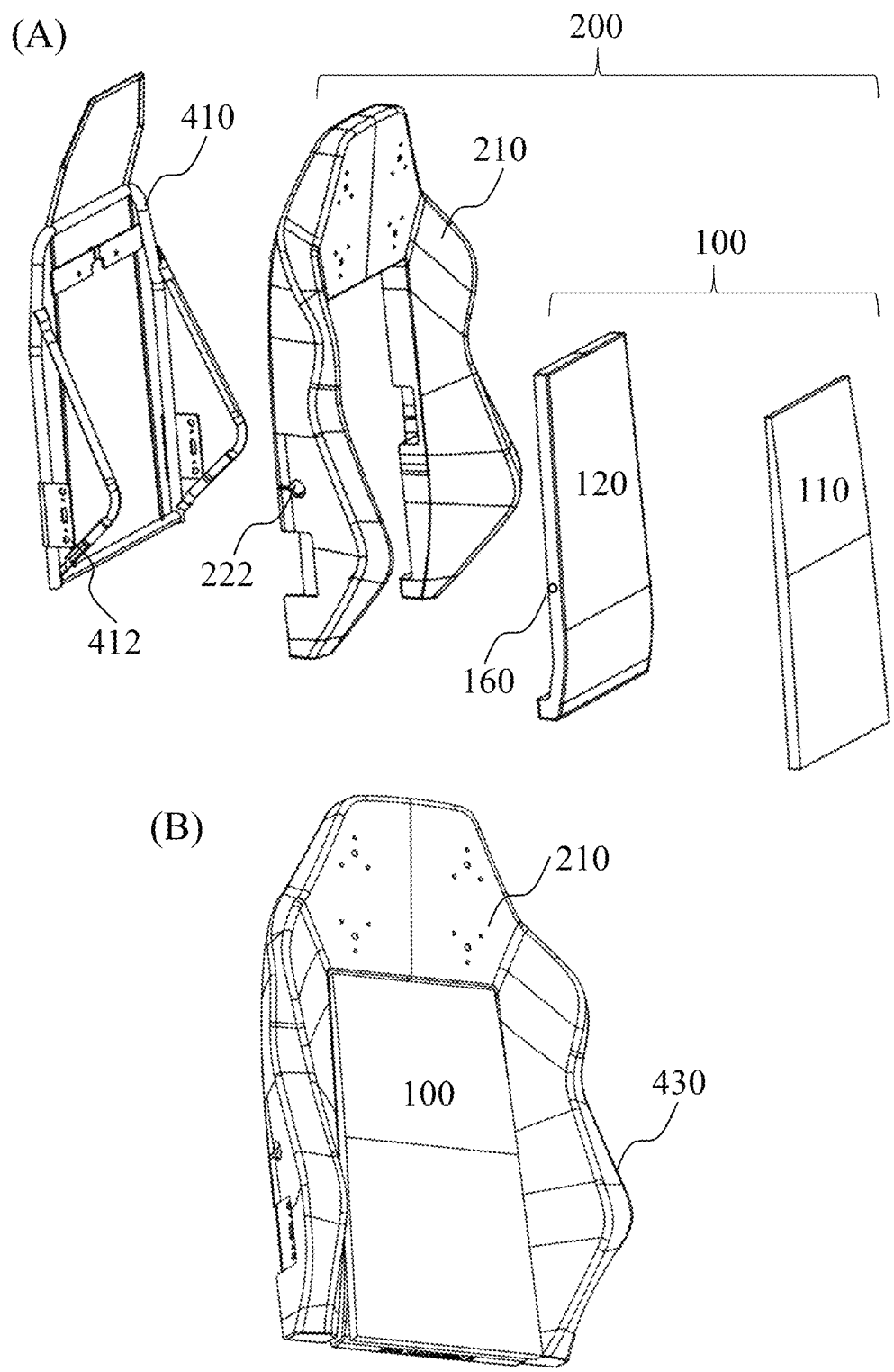
FIG. 9 shows a schematic illustration of (A) the method 400 of fitting the supportive apparatus onto another exemplary furniture item comprising a back rest of a chair; and (B) the assembled furniture item 430 comprising the supportive apparatus.

FIG. 7 shows a flowchart illustrating a method 400 of fitting a supportive apparatus onto a furniture item, in accordance with another aspect of the disclosure. FIG. 8 shows a schematic illustration of the method 400 of fitting the supportive apparatus onto an exemplary furniture item comprising a seat base of a chair. FIG. 9 shows a schematic illustration of (A) the method 400 of fitting the supportive apparatus onto another exemplary furniture item comprising a back rest of a chair; and (B) the assembled furniture item 430 comprising the supportive apparatus. The supportive apparatus may refer to the supportive apparatus 100 discussed with reference to FIGS. 1 to 5.

Referring to FIGS. 7 to 9, the furniture item may include a chassis 410 configured to receive the supportive apparatus 100. For example, as shown in FIG. 8, the chassis 410 may be dimensioned to receive the supportive apparatus 100 comprising a seat base; and in FIG. 9(A), the chassis 420 may be dimensioned to receive a back rest 200 comprising the supportive apparatus 100 as the centerpiece of the back rest 200. In various embodiments, the chassis 410 may include at least one chassis opening 412 configured to receive an attachment means.

Method 400 includes: positioning, the second layer of the supportive apparatus on the chassis of the furniture item, the second layer comprising at least one opening extending into an interior of the second layer, the at least one opening configured to receive an attachment means (step 402); and attaching, the second layer of the supportive apparatus to the chassis of the furniture item, by securing the attachment means to the at least one opening of the second layer (step 404).

In various embodiments, the second layer 120 of the supportive apparatus may comprise at least one opening 160 extending into an interior of the second layer 120. Accordingly, at step 402 of method 400, positioning the second layer 120 on the chassis 410 may comprise, positioning, e.g. aligning the at least one opening 160 of the second layer 120 to correspond with the at least one chassis opening 412 of the chassis 410 (see FIG. 8).

In some embodiments as shown in FIG. 9(A), the supportive apparatus 100 comprising a centerpiece of a back rest, may first be assembled on to the outline layer 210 of the back rest. The outline layer 210 may include at least one outline opening 222 extending through the interior of said outline layer 210, and configured to receive an attachment means. In this embodiment, at step 402 of method 400, positioning the second layer 120 on the chassis 410 may comprise, (i.) positioning, e.g. aligning the at least one opening 160 of the second layer 120 with the at least one outline opening 222 of the outline layer 210; and (ii.) positioning, e.g. aligning the at least one opening 160 of the second layer 120, the at least one outline opening 222 of the outline layer 210, to the at least one chassis opening 412 of the chassis 410. It is contemplated that the attachment means may be inserted through the chassis opening 412 and the outline opening 222 to fit the back rest 200 on the chassis 410 of the furniture item.

In various embodiments, at step 404 of method 400, attaching, the second layer of the supportive apparatus to the chassis 410 of the furniture item, may further comprise, inserting the attachment means through the chassis opening 412, and the opening 160 of the second layer (see FIG. 8). In some embodiments, step 404 may further comprise, inserting the attachment means through the chassis opening 412, the outline opening 222 and the opening 160 of the second layer (see FIG. 9(A)).

In various embodiments, the attachment means may comprise any suitable means for securing the supportive apparatus 100, e.g. the second layer 120, onto the chassis 410 of the furniture item. In some embodiments, the attachment means may comprise a rivet, a nail, a screw.

Embodiments of the disclosure thus provide an improved supportive apparatus 100 having varying densities between two polymeric foam materials, to provide structural integrity, even pressure distribution, and the ergonomic support needed for one or more users. This may alleviate the users' body aches and improve the health of the user. The improved supportive apparatus 100 is also durable, does not deform over prolonged use. For example, the improved supportive apparatus 100 retains its original shape and structure, despite repeated reclining movement of the apparatus (as part of a back rest) over time. The improved supportive apparatus 100 is also suitable for a diverse range of users having varying body weight and shapes. The disclosure further provides a method of manufacturing the improved supportive apparatus 100 that is simple, inexpensive and quick to assemble.

While the disclosure has been particularly shown and described with reference to specific embodiments, it should be understood by those skilled in the art that various changes in form and detail may be made therein without departing from the spirit and scope of the disclosure as defined by the appended claims. The scope of the disclosure is thus indicated by the appended claims and all changes which come within the meaning and range of equivalency of the claims are therefore intended to be embraced.

The invention claimed is:

1. A supportive apparatus for a furniture item, the supportive apparatus comprising
    a first layer comprising a first polymeric foam material having a first density ranging from 30 kg/m$^3$ to 60 kg/m$^3$;
    a second layer disposed on the first layer, the second layer comprising a second polymeric foam material having a second density ranging from 60 kg/m$^3$ to 90 kg/m$^3$,
    wherein the second layer comprises a unitary layer of the second polymeric foam material.

2. The supportive apparatus of claim 1, wherein the first polymeric foam material comprises a first matrix structure, the first matrix structure comprising a plurality of first foam cells,
    wherein the second polymeric foam material comprises a second matrix structure, the second matrix structure comprising a plurality of second foam cells, the second foam cells being different to the first foam cell,
    wherein each second foam cell among the plurality of second foam cells, has a density greater than a density of each first foam cell among the plurality of first foam cells.

3. The supportive apparatus of claim 2, wherein the second matrix structure comprising the plurality of second foam cells, has a uniform matrix structure along at least one of a lateral plane, a longitudinal plane, and/or a diagonal plane, of the second layer.

4. The supportive apparatus of claim 1, wherein a ratio of the first density to the second density, ranges from 50% to 95%.

5. The supportive apparatus of claim 1, wherein the first polymeric foam material has a first indentation force deflection (IFD) score, with 40% deflection, ranging from 20 to 80; and wherein the second polymeric foam material has a second IFD score, with 40% deflection, ranging from 250 to 500.

6. The supportive apparatus of claim 1, wherein the first layer comprises
    a peripheral portion positioned at an end of the first layer, the peripheral portion having a peripheral thickness; and
    a medial portion extending from the peripheral portion, in a direction perpendicular to a lateral axis of the first layer, the medial portion having a medial thickness greater than the peripheral thickness of the peripheral portion.

7. The supportive apparatus of claim 6, wherein the peripheral thickness ranges from 0.5 cm to 10 cm, and wherein the medial thickness ranges from 15 cm to 25 cm.

8. The supportive apparatus of claim 1, wherein the second layer comprises a recess extending at least partially along a surface of the second layer, and the first layer comprises a protrusion at least partially extending from a surface of the first layer, and
    wherein the recess of the second layer is configured to receive the protrusion of the first layer.

9. The supportive apparatus of claim 8, wherein the recess comprises a first recess segment having a first recess depth, and a second recess segment having a second recess depth greater than the first recess depth,
    wherein the protrusion comprises a first protrusion segment having a first protrusion height, and a second protrusion segment having a second protrusion height greater than the first protrusion height, wherein the first recess segment and the second recess segment, are configured to receive the first protrusion segment and the second protrusion segment, respectively.

10. The supportive apparatus of claim 8, further comprising an adhesive layer disposed between the first layer and the second layer, the adhesive layer configured to secure the first layer to the second layer, wherein the adhesive layer has a thickness ranging from 0.1 cm to 0.5 cm.

11. The supportive apparatus of claim 10, wherein the adhesive layer comprises an adhesive means disposed at least, partially along the surface of the second layer, and/or partially along the surface of the first layer.

12. The supportive apparatus of claim 1, wherein the first polymeric foam material comprises a memory foam polymer, and wherein the second polymeric foam material comprises a cold-cure foam polymer.

13. A chair or a mattress comprising the supportive apparatus of claim 1.

14. A method of fitting the supportive apparatus of claim 1 onto the furniture item, the furniture item comprising a chassis configured to receive the supportive apparatus, the method comprising, positioning, the second layer of the supportive apparatus on the chassis of the furniture item, the second layer comprising at least one opening extending into an interior of the second layer, the at least one opening configured to receive an attachment means;

attaching, the second layer of the supportive apparatus to the chassis of the furniture item, by securing the attachment means to the at least one opening of the second layer and to the chassis.

15. The supportive apparatus of claim 1, wherein each of the first layer and the second layer are distinct and separate to each other.

16. The supportive apparatus of claim 1, wherein the second layer is disposed directly on the first layer.

17. A method of manufacturing a supportive apparatus for a furniture item, the method comprising, providing, a first layer comprising a first polymeric foam material having a first density ranging from 30 kg/m$^3$ to 60 kg/m$^3$;

providing, a second layer for disposal on the first layer, the second layer comprising a second polymeric foam material having a second density ranging from 60 kg/m$^3$ to 90 kg/m$^3$, wherein the second layer comprises a unitary layer of the second polymeric foam material.

18. The method of claim 17, wherein the first polymeric foam material has a first matrix structure comprising a plurality of first foam cells, wherein the second polymeric foam material has a second matrix structure comprising a plurality of second foam cells, the second foam cells being different to the first foam cells, wherein each second foam cell among the plurality of second foam cells, has a density greater than a density of each first foam cell among the plurality of first foam cells.

19. The method of claim 17, wherein providing, the first layer comprises, providing, a protrusion at least partially extending from a surface of the first layer; wherein providing, the second layer comprises, providing, a recess extending at least partially along a surface of the second layer, and wherein the recess of the second layer is configured to receive the protrusion of the first layer.

20. The method of claim 19, wherein providing, the first layer further comprises, forming, on another surface of the first layer, a peripheral portion positioned at an end of the first layer, the peripheral portion having a peripheral thickness; and a medial portion extending from the peripheral portion, in a direction perpendicular to a lateral axis of the first layer, the medial portion having a medial thickness greater than the peripheral thickness of the peripheral portion.

21. The method of claim 19, further comprising, providing, an adhesive layer for disposal on at least one of the surface of the first layer, and/or a surface of the second layer, for securing the first layer to the second layer;

wherein the adhesive layer has a thickness ranging from 0.1 cm to 0.5 cm.

22. The method of claim 17, wherein the second layer is manufactured in accordance with a cold-cure foam manufacturing process.

* * * * *